United States Patent [19]
Ampferer

[11] Patent Number: 4,828,536
[45] Date of Patent: May 9, 1989

[54] CHAIN TENSIONER

[75] Inventor: Herbert Ampferer, Sachsenheim, Fed. Rep. of Germany

[73] Assignee: Dr. Ing. h.c.F. Porsche Aktiengesellschaft, Stuttgart, Fed. Rep. of Germany

[21] Appl. No.: 203,113

[22] Filed: Jun. 7, 1988

[30] Foreign Application Priority Data

Jun. 9, 1987 [DE] Fed. Rep. of Germany ....... 3719163

[51] Int. Cl.4 .............................................. F16H 7/08
[52] U.S. Cl. ..................................... 474/110; 474/111
[58] Field of Search ............... 474/101, 109, 110, 111, 474/133, 135, 136, 137, 138; 123/90.33, 90.31, 90.27

[56] References Cited

U.S. PATENT DOCUMENTS 2,963,918 12/1960 Blakstad .............................. 474/111

FOREIGN PATENT DOCUMENTS 0065450 4/1982 Japan ................................... 474/110

Primary Examiner—Thuy M. Bui
Attorney, Agent, or Firm—Barnes & Thornburg

[57] ABSTRACT

A chain tensioner acts by means of tensioning elements on the taut section and the slack section of an endless chain whcih preferably cooperate with chain sprockets of parallel cam shafts of an internal combustion engine. The tensioning elements are provided with relatively movable pistons which are nested one within the other, have a common pressure space and are accommodated in a cylindrical housing. The housing is provided with a fastening eye which extends axially parallel to the housing whereby the fastening eye is secured at an internal combustion engine housing part by a bolt. Oil is conducted to the pressure space between the pistons by way of the bolt.

16 Claims, 2 Drawing Sheets

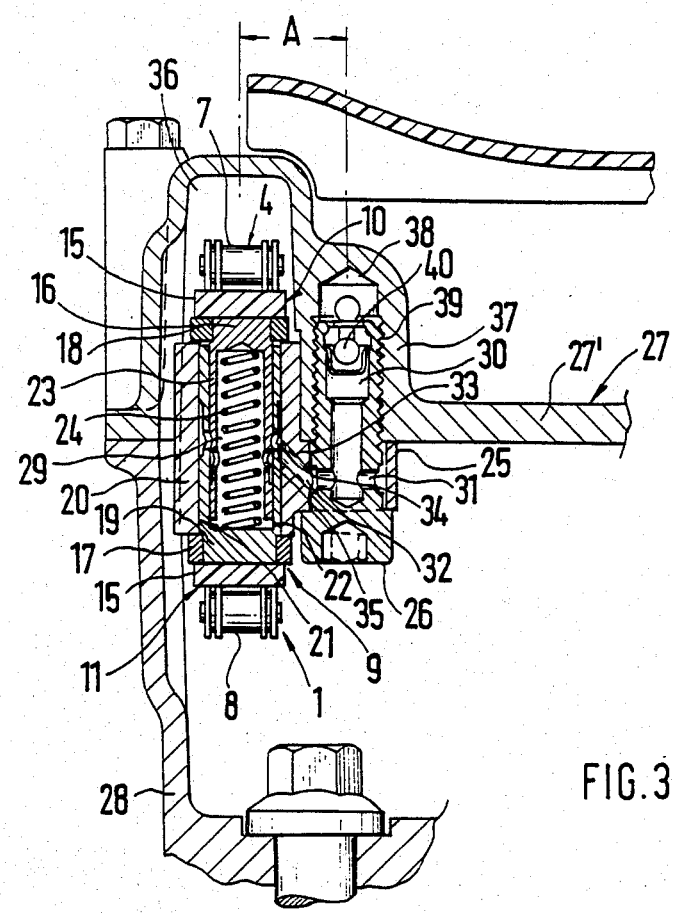

CHAIN TENSIONER

BACKGROUND AND SUMMARY OF THE INVENTION

The present invention relates to a chain tensioner for an endless chain, whereby the chain tensioner acts on the taut section and on the slack section of the chain by means of relatively movable tensioning elements provided at pistons nested one within the other, acted upon with oil from a pressure space and guided in a cylindrical housing.

A chain tensioner with a housing is described in the DE-GM No. 75 22 501 which accommodates two nested pistons. Oil is fed to the piston by way of a collecting pan.

It is the object of the present invention to provide a chain tensioner whose pressure space between the pistons is supplied with oil in a simple but safe manner. In connection therewith, the housing of these pistons is to be provided with means for the easy fastening at an internal combustion engine.

The underlying problems are solved according to the present invention in that the housing includes a fastening eye which extends essentially axially parallel to the housing and is secured at an internal combustion engine housing part by means of a bolt and in that the oil supply to the pressure space of the pistons takes place by way of the bolt and the housing.

The advantages principally achieved with the present invention reside in that the housing together with the fastening eye—and also the extensions—can be manufactured in a simple manner and can be easily fastened at the internal combustion engine housing part by means of the bolt. Therebeyond, the oil supply of the two pistons by way of the bolt is advantageous because separate external lines to the housing can be dispensed with. Additionally, the guidances between the housing and tensioning elements assure that the latter remain fixed in their predetermined position also under high loads.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 3 is a cross-sectional view taken along line III—III of FIG. 1.

DETAILED DESCRIPTION OF THE DRAWINGS

Figure 1:
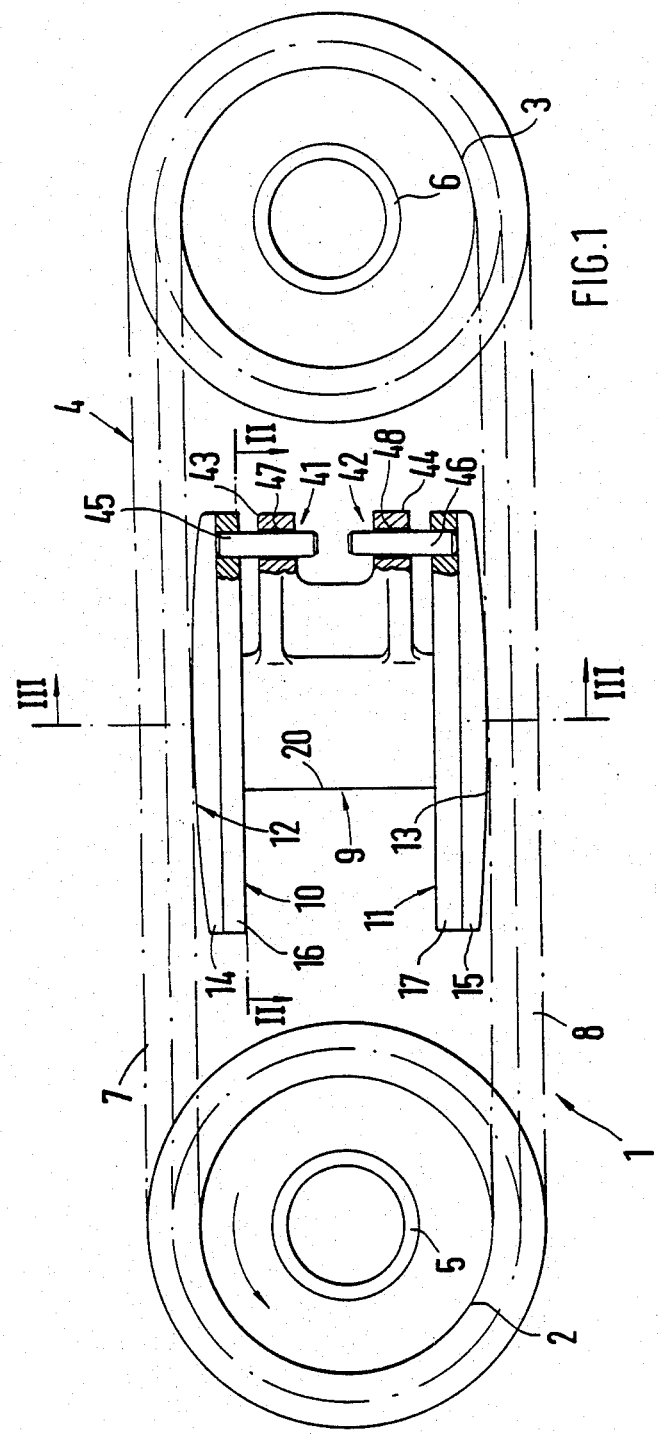
FIG. 1 is a schematic view of a chain drive with a chain tensioner in accordance with the present invention.

Referring now to the drawing wherein like reference numerals are used throughout the various views to designate like parts, the chain drive 1 includes two sprocket wheels 2 and 3 which cooperate with an endless chain 4 and are attached at parallel overhead cam shafts 5 and 6 of an internal combustion engine. The cam shafts 5 and 6 actuate V-shaped, suspended valves whereby two inlet valves and two outlet valves are provided per cylinder which is not shown.

A chain tensioner generally designated by reference numeral 9, which is arranged between the load or taut section 7 and the slack section 8, includes tensioning elements 10 and 11 acting on the taut section 7 and the slack section 8. The tensioning elements 10 and 11 are provided on the sides facing the taut section 7 and the slack section 8 with plastic material linings 14 and 15 having arcuate surfaces 12 and 13 which are secured at metallic support plates 16 and 17. The support plates 16 and 17 are securely connected with pistons 18 and 19 which are aligned approximately perpendicularly to the taut section 7 and the slack section 8. The pistons 18 and 19 are nested one within the other and are accommodated relatively movably in a cylindrical housing 20 in such a manner that the piston 19 is guided in a bore 21 of the housing 20 and the piston 18 in a bore 22 of the piston 19; the piston 18 is provided with a bore 23. A compression spring 24 seeks to stress the pistons 18 and 19 against the taut section 7, respectively, slack section 8.

Figure 2:
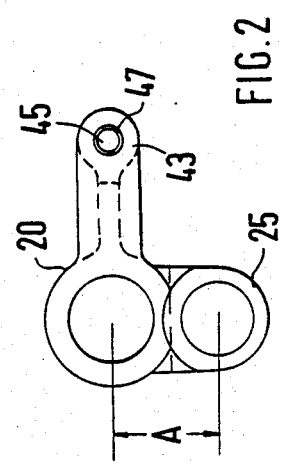
FIG. 2 is a cross-sectional view taken along line II—II of FIG. 1.

The housing 20 is provided with a fastening eye 25 which extends axially parallelly to the housing 20—distance A (FIG. 2). The fastening eye 25 is secured by means of a bolt 26 (FIG. 3) at an internal combustion housing part generally designated by reference numeral 27 which in the illustrated embodiment is a cover 27' that rests on a cylinder head 28 of the internal combustion engine. The oil supply to the common pressure space 29 of the pistons 18 and 19 takes place by way of the bolt 26 and the housing 20. For that purpose, the bolt 26 is provided with an axial bore 30 and a transversely extending through-bore 31 intersecting the bore 30. The through-bore 31 is arranged adjacent a further bore 32 which extends in a wall 33 between the housing 20 and the fastening eye 25. The further bore 32 is in communication with the pressure space bores 34 and 35 in the pistons 18 and 19.

The cover 27' surrounds the endless chain 4 and chain tensioner 9 section-wise by means of a niche 36. Additionally, the cover 27' is provided with a local thickened portion 37 which includes an oil supply bore 38 and a threaded bore 39. The bolt 26 is screwed into the threaded bore 39.

A valve 40 is arranged in the oil supply bore 38 which blocks the return flow of the oil, for example, at corresponding pressure level in the pressure space 29. The valve 40 is inserted in the illustrated embodiment into the bore 30 of the bolt 26.

Guide devices 41 and 42 are provided between the housing 20 and the tensioning elements 10 and 11. The guide devices 41 and 42 are formed, on the one hand, by lateral extensions 43 and 44 of the housing 20 and, on the other, by bolts 45 and 46 of the tensioning elements 10 and 11, whereby the bolts 45 and 46 are arranged relatively movably in bores 47 and 48 of the extensions 43 and 44.

Finally, the housing 20, the fastening eye 25 and the extensions 43 and 44 are made in one piece.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A chain tensioner for an endless chain, comprising relatively movable tensioning means acting on the taut section and the slack section of the chain, said tensioning means including relatively movable piston means guided in a cylindrical housing means, nested one within the other and operable to be acted upon with oil from a pressure space, the housing means including fastening eye means which extends substantially axially parallel to the housing means and is secured at an internal combustion engine housing part by bolt means, and the oil supply into the pressure space of the piston means taking place by way of the securing bolt means and the housing means.

2. A chain tensioner according to claim 1, wherein the endless chain is part of a chain drive operable between two parallel cam shafts of an internal combustion engine.

3. A chain tensioner according to claim 2, wherein an oil supply bore connected with the chain tensioner includes a valve.

4. A chain tensioner according to claim 3, wherein the valve is inserted into the axial bore of the bolt means.

5. A chain tensioner according to claim 1, wherein the bolt means includes an axial bore and a through-bore extending substantially transversely thereto, the through-bore being provided adjacent a further bore in a wall between the fastening eye means and the housing means.

6. A chain tensioner according to claim 5, wherein the internal combustion engine housing part is a cover means surrounding section-wise the chain.

7. A chain tensioner according to claim 6, wherein the cover means includes a locally thickened portion having a threaded bore into which the bolt means is screwed.

8. A chain tensioner according to claim 7, wherein an oil supply bore connected with the chain tensioner includes a valve.

9. A chain tensioner according to claim 8, wherein the valve is inserted into the axial bore of the bolt means.

10. A chain tensioner according to claim 7, further comprising guide means provided between the housing means and the tensioning means.

11. A chain tensioner according to claim 10, wherein the guide means include extensions extending laterally away from the housing means in which are provided bores extending axially parallelly to the housing means, and relatively movable bolts of the tensioning means being arranged in the bores.

12. A chain tensioner according to claim 1, wherein the internal combustion engine housing part is a cover means surrounding section-wise the chain.

13. A chain tensioner according to claim 12, wherein the cover means includes a locally thickened portion having a threaded bore into which the bolt means is screwed.

14. A chain tensioner according to claim 1, further comprising guide means provided between the housing means and the tensioning means.

15. A chain tensioner according to claim 14, wherein the guide means include extensions extending laterally away from the housing means in which are provided bores extending axially parallelly to the housing means, and relatively movable bolts of the tensioning means being arranged in the bores.

16. A chain tensioner according to claim 15, wherein the housing means, the fastening eye means and the extensions are made in one piece.

* * * * *